US010145962B1

(12) United States Patent
Nikkhah et al.

(10) Patent No.: US 10,145,962 B1
(45) Date of Patent: Dec. 4, 2018

(54) ADAPTIVE LOCALIZATION AND INCREMENTAL DEPLOYMENT OF INFRASTRUCTURE WITH CROWD-SOURCED FEEDBACK

(71) Applicant: Cisco Technology, Inc., San Jose, CA (US)

(72) Inventors: Mehdi Nikkhah, Belmont, CA (US); Rob Liston, Menlo Park, CA (US); Wai-tan Tan, Sunnyvale, CA (US); Xiaoqing Zhu, Austin, TX (US); Santosh G. Pandey, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/726,553

(22) Filed: Oct. 6, 2017

(51) Int. Cl.
| | |
|---|---|
| H04W 24/00 | (2009.01) |
| G01S 19/46 | (2010.01) |
| G01S 19/48 | (2010.01) |
| G01S 19/25 | (2010.01) |
| G01S 19/06 | (2010.01) |
| G01S 19/47 | (2010.01) |

(52) U.S. Cl.
CPC .............. *G01S 19/46* (2013.01); *G01S 19/06* (2013.01); *G01S 19/252* (2013.01); *G01S 19/48* (2013.01); *G01S 19/47* (2013.01)

(58) Field of Classification Search
CPC ....................................................... G01S 19/46
USPC ..................................................... 455/456.1
See application file for complete search history.

(56) References Cited

U.S. PATENT DOCUMENTS

| | | | | |
|---|---|---|---|---|
| 6,999,766 B1 * | 2/2006 | Padovani | ............... | H04W 24/00 455/437 |
| 8,437,772 B2 * | 5/2013 | Moeglein | ................ | G01S 5/021 342/357.29 |
| 2013/0317944 A1 | 11/2013 | Huang et al. | | |
| 2014/0171068 A1 | 6/2014 | Marti et al. | | |

* cited by examiner

*Primary Examiner* — Joel Ajayi
(74) *Attorney, Agent, or Firm* — Edell, Shapiro & Finnan, LLC

(57) ABSTRACT

A methodology includes receiving from a first mobile device a first estimated location of the first mobile device and a first estimated error associated with the first estimated location, the first estimated location being based on first coarse data from a first wireless access point location determination system fused with inertial measurement unit (IMU) data from the first mobile device, receiving from a second mobile device a second estimated location of the second mobile device and a second estimated error associated with the second estimated location, the second estimated location being based on second coarse data from the first wireless access point location determination system fused with IMU data from the second mobile device, and based on the first estimated error and the second estimated error, determining a recommended change to a deployment of a wireless access point associated with the first wireless access point location determination system.

16 Claims, 11 Drawing Sheets

EXAMPLE: ESTIMATED INITIAL HEADING OVER TIME

ADAPTIVE LOCALIZATION AND INCREMENTAL DEPLOYMENT OF INFRASTRUCTURE WITH CROWD-SOURCED FEEDBACK

TECHNICAL FIELD

The present disclosure relates to determining a location of a mobile electronic device.

BACKGROUND

It is now possible to determine the location of a mobile electronic device using the Global Positioning System (GPS), or triangulation using receive signal strength from mobile telephone cellular towers or previously mapped radio frequency (RF) transmitters, such wireless access points. Location coordinates from GPS signals can be accurate to within several meters, but the signals are often not available indoors. RF triangulation techniques might have accuracy on the order of 1-25 meters, but can also be off by 100 meters or more in some cases.

DESCRIPTION OF EXAMPLE EMBODIMENTS

Overview

A methodology includes receiving from a first mobile device a first estimated location of the first mobile device and a first estimated error associated with the first estimated location, the first estimated location being based on first coarse data from a first wireless access point location determination system fused with inertial measurement unit (IMU) data from the first mobile device, receiving from a second mobile device a second estimated location of the second mobile device and a second estimated error associated with the second estimated location, the second estimated location being based on second coarse data from the first wireless access point location determination system fused with IMU data from the second mobile device, and based on the first estimated error and the second estimated error, determining a recommended change to a deployment of a wireless access point associated with the first wireless access point location determination system.

In another embodiment, a device is provided. The device includes an interface unit configured to enable network communications, a memory, and one or more processors coupled to the interface unit and the memory, and configured to: receive from a first mobile device a first estimated location of the first mobile device and a first estimated error associated with the first estimated location, the first estimated location being based on first coarse data from a first wireless access point location determination system fused with inertial measurement unit (IMU) data from the first mobile device, receive from a second mobile device a second estimated location of the second mobile device and a second estimated error associated with the second estimated location, the second estimated location being based on second coarse data from the first wireless access point location determination system fused with IMU data from the second mobile device, and based on the first error and the second error, determine a recommended change to a deployment of a wireless access point associated with the first wireless access point location determination system.

Example Embodiments

Figure 1:
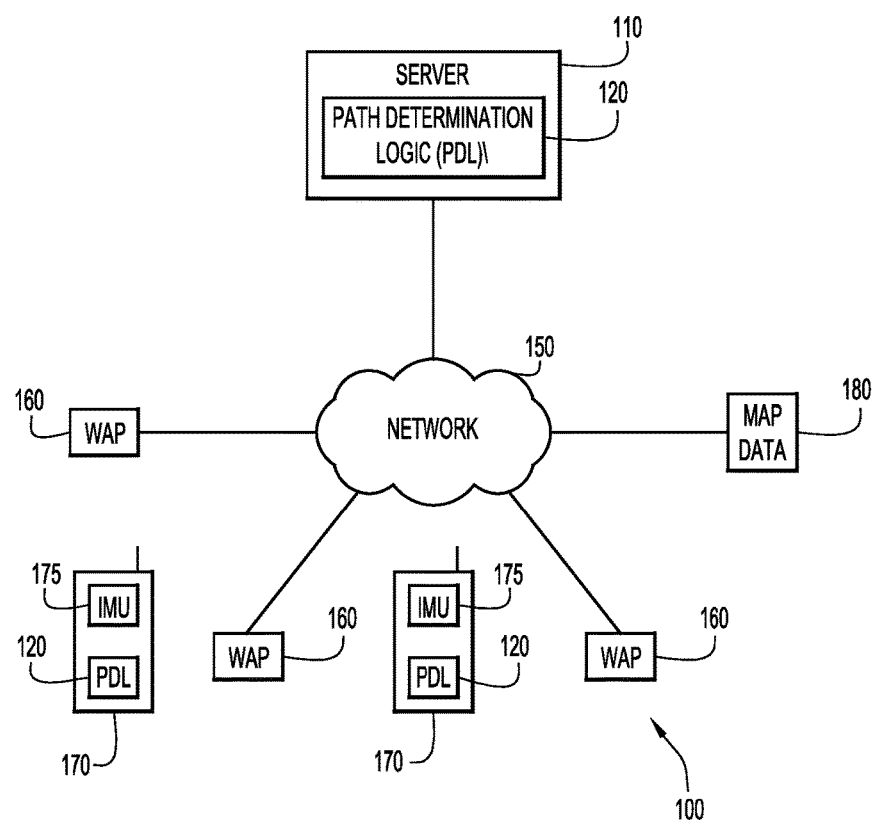
FIG. 1 depicts an electronic communications network in which path determination logic may operate in accordance with an example embodiment.

FIG. 1 depicts an electronic communications network 100 in which path determination logic 120 may operate in accordance with an example embodiment. As will be explained in detail herein, path determination logic 120 is configured to combine two separate types of location data to generate a real time path or a location of a mobile device. One of the feeds is coarse location data based on, e.g., wireless access point triangulation using receive signal strength, and the other of the feeds is highly accurate, or fine grained, inertial navigation system (INS) or inertial measurement unit (IMU) data captured from and by the mobile device. Embodiments described herein match or fuse the respective course and fine data sets to generate an optimized estimate of a location and/or path of the mobile device.

Referring to FIG. 1, a server 110 may host path determination logic 120, which may be in the form of hardware or logic instructions stored on server 110. Server 110 (and path determination logic 120) are in communication with a network 150, such as the Internet. Also in communication with network 150 are a plurality of wireless access points 160 (e.g., wireless fidelity (Wi-Fi) hot spots (i.e., wireless local area networking devices based on the IEEE 802.11 standards), Bluetooth devices (i.e., a wireless device configured to exchange data over short distances (using short-wavelength UHF radio waves in the ISM band from 2.4 to 2.485 GHz) from fixed and mobile devices, etc.)) deployed at predetermined locations, and a plurality of mobile devices 170, which might include any one or more of a cellular telephone, laptop computer, tablet computer, personal digital assistant, or the like. Mobile device 170 includes IMU sensors 175, which may include any one or more of an accelerometer, compass, gyroscope, etc. that can generate data indicative of the real-time relative movement of mobile device 170.

Although path determination logic 120 is shown as being hosted on server 110, path determination logic (PDL) 120 may also be hosted on mobile device 170. In this way, less data need to be shared across network 150 for purposes of accurate path determination.

As will be explained in greater detail below, path determination logic 120 is configured to collaboratively use coarse absolute location (CAL) coordinates of a given mobile device, derived in connection with the wireless access points 160, and fine or accurate relative location (ARL) coordinates, derived from mobile device 170 IMU data, to derive an accurate path that the mobile device 170 is taking, in real time. The path mobile device 170 may be taking may be plotted on a map obtained from map data 180 supplied to path determination logic 120 (which, again, could also be hosted on mobile device 170). Map data 180 may also be used to help seed, or refine, how the CAL coordinates and ARL coordinates are matched, fused or combined.

Figure 2:
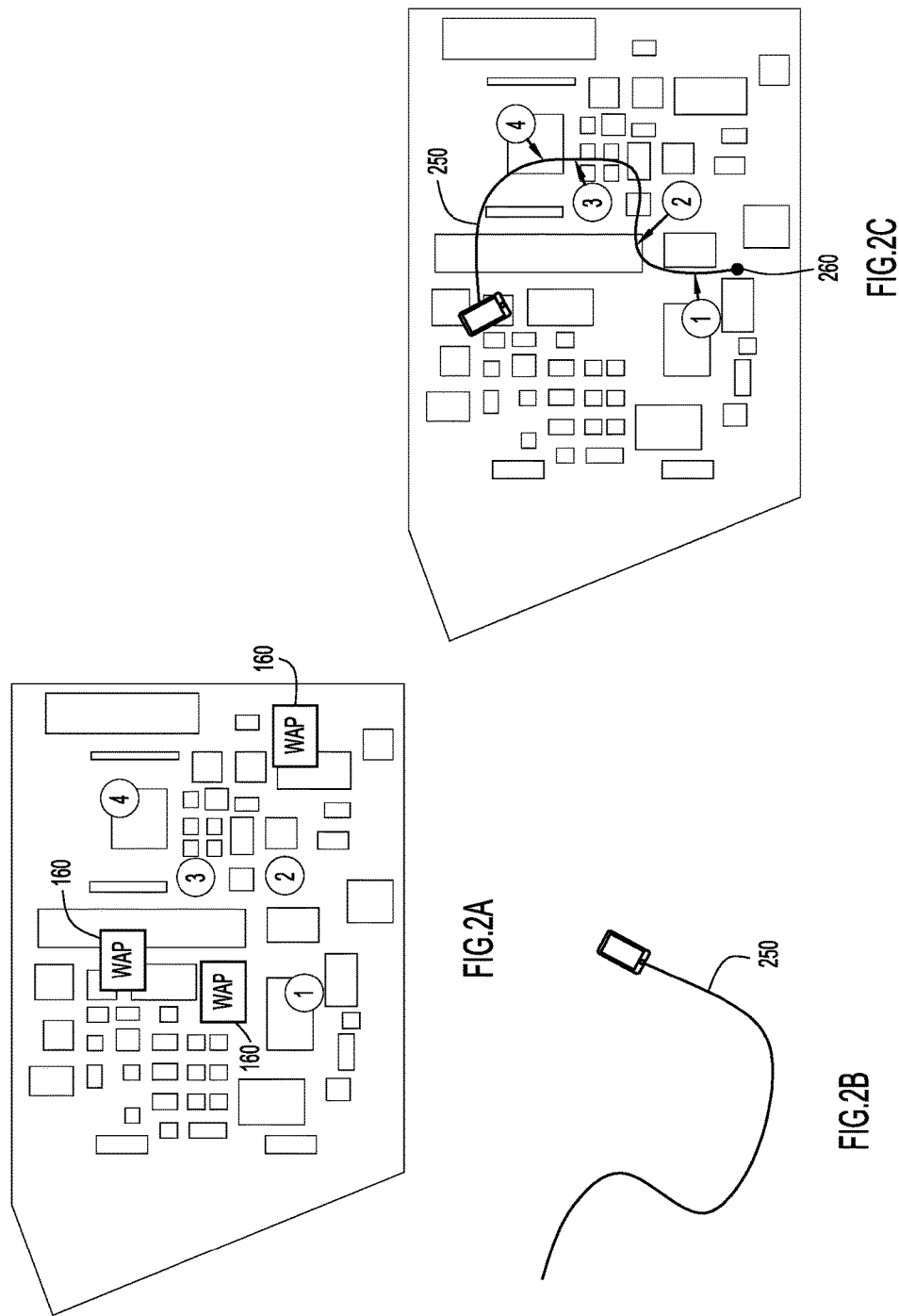
FIG. 2A depicts a map showing a plurality of access points and four estimated locations of a mobile device based on triangulation calculations using the plurality of wireless access points in accordance with an example embodiment.
FIG. 2B depicts an "unanchored" path of a mobile device that occurs in a same time window as the four estimated locations shown in FIG. 2A in accordance with an example embodiment.
FIG. 2C depicts a result of executing path determination logic and anchoring the "unanchored" path of FIG. 2B to the map of FIG. 2A in accordance with an example embodiment.

FIG. 2A depicts a floor plan map 200 of, e.g., a store having a plurality of aisles. Map 200 may be derived from map data 180. Map 200 also shows a plurality of wireless access points 160 deployed at several locations on the floor plan. Numerals 1-4 indicate four respective estimated locations over a period of time of a mobile device based on triangulation calculations using the plurality of wireless access points 160 in accordance with an example embodiment. That is, assume a user of mobile device 170 is walking through the store. Mobile device 170 is configured to receive transmissions from any wireless access point 160. The mobile device 170 is further configured to evaluate the received respective transmissions and calculate a respective receive signal strength. Using the received signal strength (angle of arrival, or time of flight, or combinations thereof) and knowing locations of the wireless access points 160, a triangulation calculation can be periodically performed, and a corresponding estimated location of the mobile device can be determined. In the case of FIG. 2A, four estimated coarse locations are anchored to, or indicated on, map 200 and can be stored in the form of, e.g., $T_n$, $X_n$, $Y_n$, where T is a time, and X and Y are coordinates on map 200.

FIG. 2B depicts an "unanchored" path 250 of mobile device 170 that occurs in a same time window as the four estimated coarse locations shown in FIG. 2A in accordance with an example embodiment. That is, starting from a given point in time, IMU data can be used to plot a relative path based on movements of the mobile device 170. Notably, this path is not tied to any specific initial absolute location or heading, but rather all movements are relative to prior movements. Thus, in the case of FIG. 2B, an accurate path 250 is generated in real time, but this path is not tied to any absolute location in real coordinates.

FIG. 2C depicts a result of executing path determination logic 120 and "anchoring" the "unanchored" path 250 of FIG. 2B to the map 200 of FIG. 2A in accordance with an example embodiment. For simplicity, wireless access points 160 are not shown in FIG. 2C. As shown, path 250 is anchored to an absolute starting point 260 and rotated such that path 250 optimally fits with, or optimally matches, the four respective estimated locations 1-4.

Thus, as explained, IMU data from the mobile device 170 is used to determine fine grained, relative, "locations," but these "locations" need help to established correspondence to locations on a physical map, i.e., absolute coordinates. Path determination logic 120 provides this help and enables collaboration between two types of data, as follows:

Coarse Absolute Location (CAL) data, which is obtained from a wireless access point location determination system such as CMX (available from Cisco Systems, Inc., San Jose, Calif.), or a Bluetooth technology such as iBeacon (developed by Apple, Inc, Cupertino, Calif.); and Accurate Relative Location (ARL) data, which is obtained from inertial position data obtained from INS or IMU sensors such as a gyroscope and/or accelerometer. Such position determination may be considered to be dead-reckoning based, and involve open-loop integration of direction and distance in a plane of a floor plan.

As noted above, path determination logic 120 may be executed in a remote server 110 or on a mobile device 170 and is configured to execute two main operations:

1. Use CAL data and path to orient and scale ARL data; and
2. Cross validate to filter erroneous data.

The CAL data and path is used to orient and scale ARL data and path by optimizing global parameters (e.g., initial position $X_0$, $Y_0$, heading θ), and can be solved using energy minimization methods based on minimizing error between a rolling time window of CAL and ARL paths. Such energy minimization methods are discussed below. As an extension, an optimization objective can also include terms that reflect how closely a transformed path (ARL after global scaling and rotation) matches an existing path, e.g., a predetermined pathway through aisles, provided (e.g., via map data 180) as an input to the path determination logic 120.

In connection with cross validation to filter erroneous data, in normal operations, the path shape under ARL has lower error and can be used to filter and remove erroneous data points from a given CAL path. Under some conditions, however, such as a mobile device user waving the mobile device 170 in his/her hand as he/she walks, error drift can quickly build up. In such a case, CAL can help to filter and trim ARL paths into a shorter length that remains true.

Two "energy minimization" embodiments with different reliance on accuracy of wireless access point triangulation timestamps are contemplated: Least Square Points Matching optimization and Monte Carlo Path Matching.

1. Least Square Points Matching optimization

This optimization technique relies on matching corresponding points (in time) in CAL data and ARL data. As such, path determination logic 120 relies on timing accuracy/overlap from reported locations. The choice of least square as energy allows solving for global translation and rotation theta directly without iterative procedures. Specifically, translation is the difference in centroid of the corresponding points in CAL data and ARL data, and theta can be solved directly from the following expression where c is CAL coordinates, and p is ARL coordinates expressed as complex numbers: $e^{\wedge}(2j\ theta)=(Sum\ cp)/(Sum\ c^*p)$, where * designates complex conjugate.

2. Monte Carlo (Random Sampling) Path Matching

Monte Carlo, or random sampling, path matching does not rely on precise timing and allows for any points in CAL data to match points in ARL data without restriction on timing. It suffices to randomly select, e.g., one thousand pairs of (offset, theta) pairs and select the set of parameters with least error. Sampling can be truly random, and be skewed towards last best parameters. Energy terms can include distance between CAL and ARL paths for the chosen parameter set, and also ARL and the assumed prior path (e.g., aisles in a store).

The "energy minimization" formulation can accommodate (either as constraints or as additional weighted terms in a cost function) various useful prior information. For example, a constraint may be "valid/popular paths" for a given map. The map of "valid/popular paths" can be either generated manually (e.g., provided by a site manager, e.g., via site survey via map data 180) or derived from crowd-sourced "heat maps" of previously collected user locations and trajectories (discussed later herein). Another possible constraint or useful prior information might be a location where a user makes a turn, which is likely at one of the "junction points" on a valid path (again, possibly correlated to map data 180).

Figure 3:
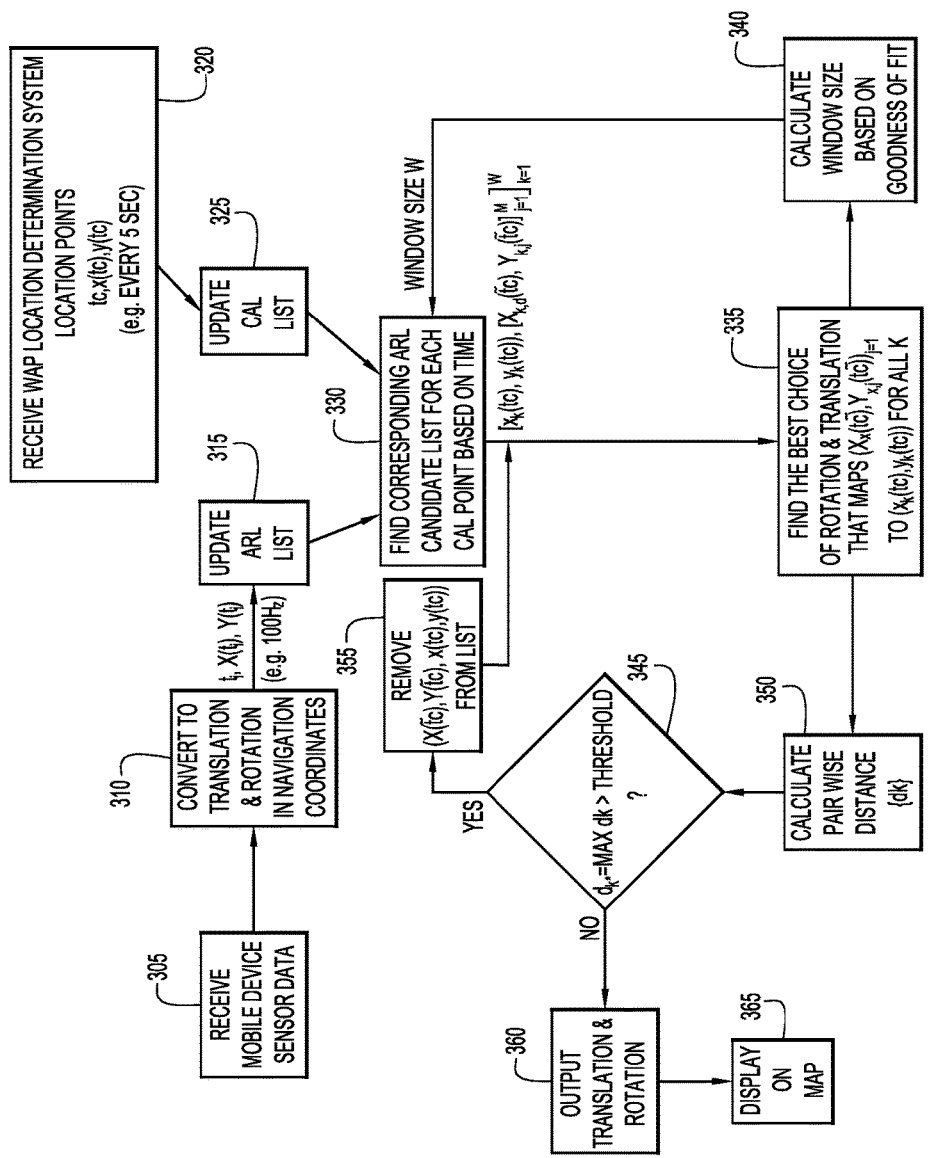
FIG. 3 is a flow chart showing a series of operations that may be performed by path determination logic in accordance with an example embodiment.

FIG. 3 is a flow chart showing a series of operations that may be performed by path determination logic 120 in accordance with an example embodiment. At 305, path determination logic 120 receives IMU sensor data from the mobile device 170. At 310, path determination logic 120 converts the sensor data into translation and rotation data in navigation coordinates, e.g., a time stamp with an X, Y coordinate (in relative terms). At 315, path determination logic 120 updates an IMU (fine, accurate) location (ARL) list, e.g., at a frequency of 100 Hz. Meanwhile, at 320, path determination logic 120 receives wireless access point location determination system data/location points in the form of a time stamp and X, Y coordinates. At 325, path determination logic 120 updates a wireless access point location determination system location (CAL) list.

At 330, path determination logic 120 identifies a corresponding IMU (fine, ARL) candidate for each wireless access point location determination system data location in the CAL list, based on time (in accordance with, e.g., the least squares method). At 335, path determination logic 120 finds the best choice of rotation and translation that maps the collection of (list of) fine, ARL location coordinates to the collection of (list of) CAL wireless access point location determination system data location coordinates. At 340, a window size is calculated or revised based on a goodness of fit. One example of "goodness of fit" may be to compare the value of a normalized cost function (e.g., 1/W C, where C is the cost function described below, which corresponds to the mean-square distance between matched points within a given window) against a threshold. The threshold value can either be a constant, or a function of the window size (e.g., monotonically increasing with window size thus favoring matchings over longer windows). The window size W is passed back to operation 330 to provide a constraint on the totality of data that is being processed.

At 345, path determination logic 120 calculates the pair-wise distance between pairs of the CAL coordinates and the ARL coordinates. At 350 and 355, it is determined whether any pairs from the lists should be removed as a result of the distance being greater than a predetermined threshold, to optimize the processing. At 360, an optimized translation and rotation of the ARL coordinates are output, and at 365 the optimized translation and rotation is applied to the ARL coordinates and displayed on a map like that shown in FIG. 2C.

In connection with operation 335, finding the best choice of rotation and translation of the ARL data/path, it can be helpful to think of the challenge as a cost function to be optimized, where the cost function may be considered as an energy term, as follows:

$$\min_{\theta,T} \|c - pe^{j\theta} + T\|_2 \text{ where}$$
$$c = \{c_k\}_{k=1}^{W} = \{x_k + jy_k\}_{k=1}^{W}$$
$$p = \{p_k\}_{k=1}^{W} = \{X_k + jY_k\}_{k=1}^{W}$$

$$p_k \in [X_{k,i} + jY_{i,k}]_{k=1}^{M}$$

As noted, there are two alternative methods for finding an optimal solution: Least-Square Optimization, and Monte Carlo (random sampling) Optimization.

Least-Square Optimization

There is closed form expression for offset/translation (T=x0+jy0) and rotation (θ) if least square is chosen as the metric to minimize:

c={ck} is the collection of CAL coordinates expressed as complex numbers; $\bar{c}$ indicates complex conjugates of c p={pk} is the collection of ARL coordinates at corresponding times as complex numbers; $\bar{p}$ indicates complex conjugates of p Optimal offset/translation T: difference in centroid of CAL and centroid of ARL points $$T = \frac{1}{W}\sum_{k=1}^{W} ck - \frac{1}{W}\sum_{k=1}^{W} pk$$

Optimal rotation θ:

$$e^{2j\theta} = \frac{\sum c\bar{p}}{\sum \bar{c}p}$$

In this approach, each CAL point is mapped to one (M=1) corresponding CAL point in operation 330 in FIG. 3.

A constant, predictable time for computation via calculation of this closed form expression is possible.

Derivation of Closed Form Minimization

Let $\{C_i\}$ be the CAL positions, and $\{P_i\}$ be the ARL positions in their respective coordinate system represented as complex numbers Form centroids $C^* = \text{mean}(\{C_i\})$ $P^* = \text{mean}(\{P_i\})$ Form new centroid subtracted variables:

$c_i = C_i - C^*$ $p_i = P_i - P^*$

Note that $\Sigma c_i = p_i = 0$

Path determination logic 120 is configured to find rotation by θ and translation by T that minimizes sum square point-wise distance between $\{c_i\}$ and $\{p_i\}$.

$$\arg\min_{\theta,T} \sum_i d_i \bar{d}_i$$

Where $d_i = c_i - p_i e^{j\theta} + T$ $\bar{d}_i$ complex conjugate of $d_i$

Then $\theta$ and translation of $T + P^* e^{j\theta} - C^*$ would minimize sum square distance between $\{C_i\}$ and $\{P_i\}$ since they are related by change of coordinates.

Note that $$d_i \bar{d}_i = (c_i - p_i e^{j\theta} + T)(\overline{c_i} - \overline{p_i} e^{-j\theta} + \overline{T}) = T\overline{T} + (c_i - p_i e^{j\theta})$$
$$\overline{(c_i - p_i e^{j\theta})} + T(\overline{c_i} - \overline{p_i} e^{-j\theta}) + \overline{T}(c_i - p_i e^{j\theta})$$

Since $\Sigma c_i = \Sigma p_i = 0$, $$\Sigma_i d_i \bar{d}_i = \Sigma_i T\overline{T} + (ci - p_i e^{j\theta})\overline{(ci - p_i e^{j\theta})}.$$

Obviously, the energy expression is minimized when $T=0$. Thus $$\Sigma_i d_i \bar{d}_i = \Sigma_i (ci - p_i e^{j\theta})\overline{(ci - p_i e^{j\theta})}$$

Differentiating with respective to $\theta$ and setting derivative to zero, we have:

$$0 = \Sigma_i (ci - p_i e^{j\theta}) \overline{p_i} e^{-j\theta}(-j) + \overline{(ci - p_i e^{j\theta})} p_i e^{j\theta} j = j\Sigma_i (-c_i + p_i e^{j\theta})$$
$$\overline{p_i} e^{-j\theta} + \overline{(ci - p_i e^{j\theta})} p_i e^{j\theta}$$

Re-arranging:

$$0 = \Sigma_i - c_i \overline{p_i} e^{-j\theta} + p_i \overline{p_i} + p_i \overline{c_i} e^{j\theta} - p \overline{p_i}$$

Therefore:

$$e^{2j\theta} = \frac{\sum_i c_i \overline{p_i}}{\sum_i \overline{c_i} p_i}$$

Monte Carlo Optimization (i.e., Random Sampling)

As noted, a Monte Carlo, a random sampling, approach to energy minimization or pattern matching may be implemented in operation 335. In this regard, path determination logic 120 can randomly generate candidate $(z_0, \theta)$ pairs, evaluate their energy, and choose the pair with minimal energy. Sampling can be truly random, or can be skewed towards last best parameters. Evaluation does not need to be restricted to matching sets of points as in the previous least square approach (e.g., if CAL data introduces variable unknown latency), but can be relaxed to point-to-path matching (i.e., M>1). Energy terms can include distance between CAL and ARL paths for the chosen parameter set, and also ARL and prior path (such as aisles in a store). In this approach, path determination logic 120 provides a predictable computational burden by selecting a constant number of random candidate pairs.

It is noted that "random sampling" need not be fully random. For example, at time T it may be observed that a particular set of translation and rotation parameters to be optimal. As a result, at a next instance, the methodology may be configured to "randomly" sample more densely near previous data.

The following is pseudo code for one possible implementation of the Monte Carlo (random sampling) optimization approach.

tx,ty,r=global translation and rotation parameters
arl[ ]=ARL path points with 0,0 origin and arbitrary orientation
cal[ ]=CAL points
every, e.g., 1 second:
for n_iter:
  dx,dy,dr=random numbers from a normal distribution with mean=0 transform ins[ ] points by rotating by r+dr, then translating by x+dx,y+dy cost=sum(distance from every cal[ ] point to nearest transformed arl[ ] point) if cost<min_cost then min_cost=cost, min_dr=dr, min_dx=dx, min_dy=dy
tx+=min_dx
ty+=min_dy
r+=min_dr Those skilled in the art will appreciate that alternative cost functions can be used. One example is to employ a L-1 norm of the distance between CAL and ARL coordinates. While the closed-form solution in the first embodiment no longer applies, the Monte Carlo Optimization method can still be used.

It is noted that a distinction between the least square matching technique and the random sampling technique is that the first approach assumes that time correspondence between the CAL data and the ARL data are accurate, while the latter does not even use timing. These are two extremes, and in practice, there is a possible middle ground in which there is some timing correspondences that are not completely accurate, but may be up to, e.g., 1 second wrong but not more. For instance, the Monte Carlo technique can be modified by rejecting translation and rotation tx, ty, r that does not map CAL coordinates at time T0, T1, T2, . . . to ARL coordinates paths in windows [T0−D, T0+D], [T1−D, T1+D], [T2−D, T2+D], where D is a predetermined threshold.

Figure 4:
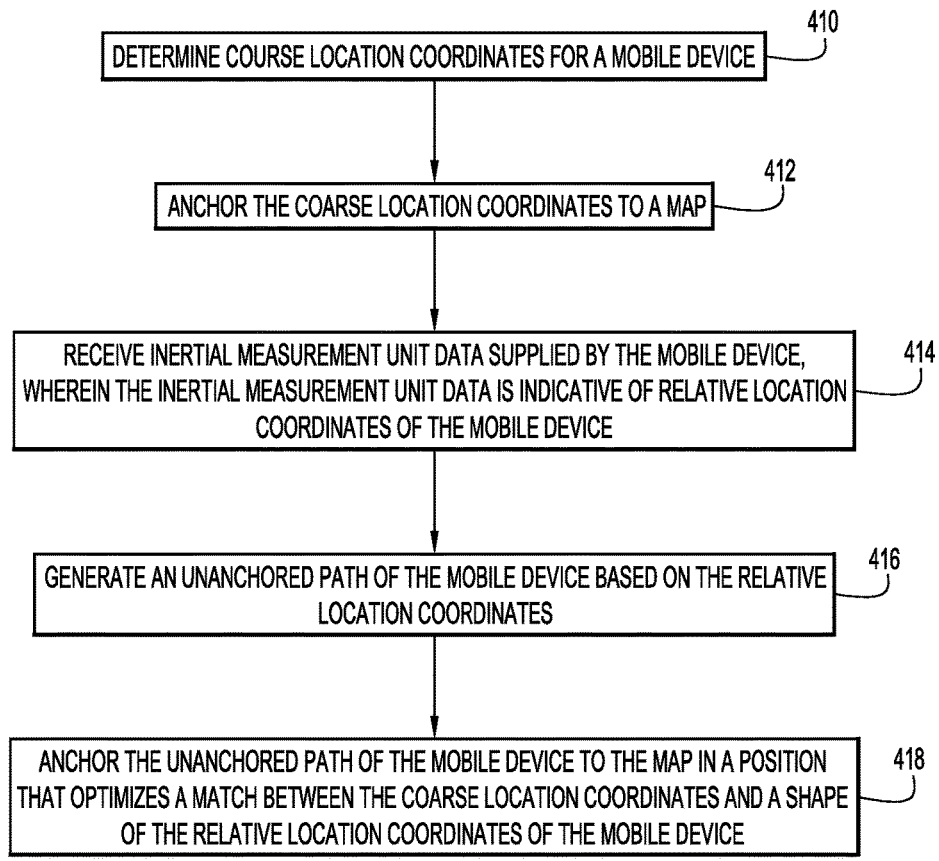
FIG. 4 is another flow chart of a series operations that may be performed by path determination logic in accordance with an example embodiment.

FIG. 4 is another flow chart of a series of operations that may be performed by path determination logic 120 in accordance with an example embodiment. At 410, path determination logic determines coarse location coordinates for a mobile device. At 412, path determination logic anchors the coarse location coordinates to a map. At 414, path determination logic receives inertial measurement unit data supplied by the mobile device, wherein the inertial measurement unit data is indicative of relative location coordinates of the mobile device. At 416, path determination logic generates an unanchored path of the mobile device based on the relative location coordinates. And, at 418, path determination logic anchors the unanchored path of the mobile device to the map in a position that optimizes a match between the coarse location coordinates and the unanchored path of the mobile device.

The foregoing describes a collaborative use of coarse location data (CAL data) from, e.g., a wireless access point location determination system, and mobile device sensor information to achieve responsive and accurate indoor location that can be used for a turn-by-turn navigation application on the mobile device or a remote sever.

There are several advantages to the described embodiments. For example, ARL data provides fine spatial and time resolution while CAL data eliminates drift that tends to accrue from inertial (dead-reckoning) systems. The embodiments described herein are operable with wireless access point triangulation including Wi-Fi and iBeacon type deployments. The approaches also may optionally exploit prior paths.

Deployment Modification Using Crowd-Sourced Error Confidence Information

The accuracy and performance of an indoor localization system, like that described herein, can be improved using a feedback loop. In particular, it may be helpful to characterize the performance of the overall system, and to suggest candidate modifications to improve performance.

In this regard, and in one possible implementation, location information from a plurality of mobile devices 170 may be aggregated in a crowd sourcing manner to identify candidate modifications. More specifically, the output of path determination logic 120 may include error confidence information along with the estimated location or path information. Such error confidence information may be leveraged in connection with a crowd sourcing technique as explained below.

Figure 5:
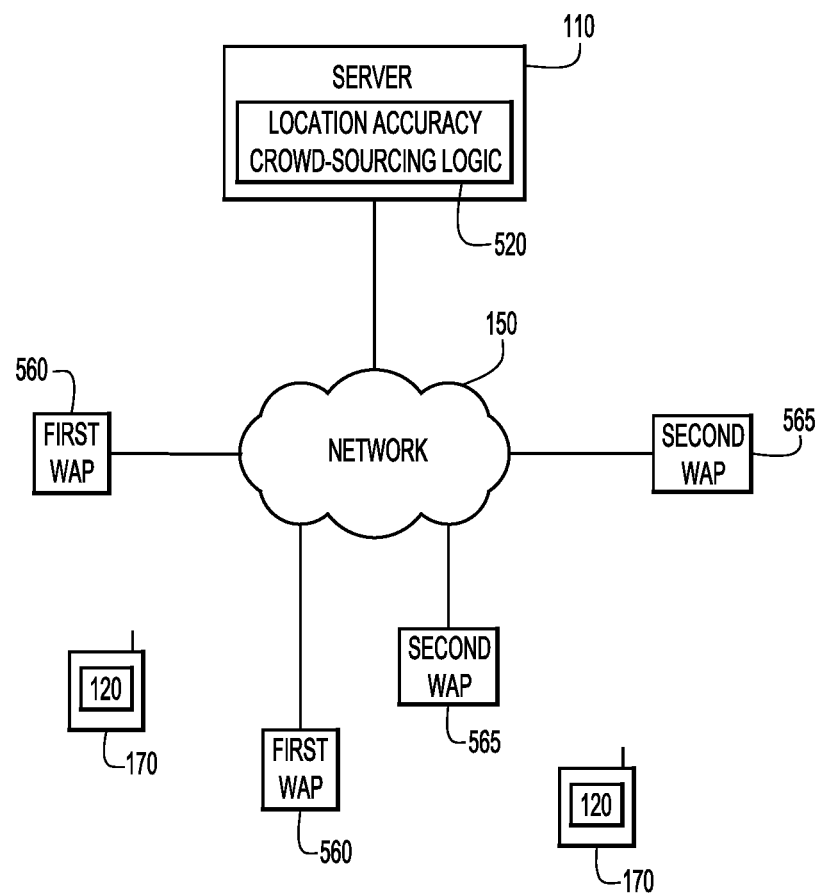
FIG. 5 depicts an electronic communications network in which location accuracy crowd-sourcing logic may operate in accordance with an example embodiment.
Figure 6A:
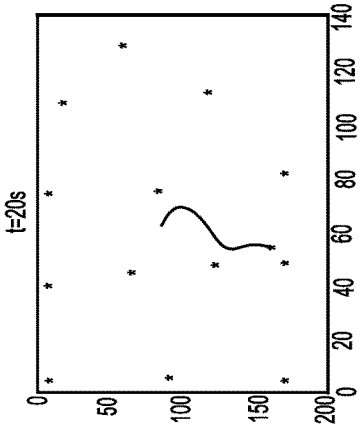
FIGS. 6A-6F illustrate the evolution of an estimated trajectory of a mobile device over time in accordance with an example embodiment.
Figure 6B:
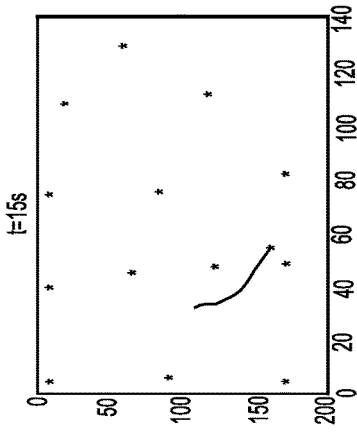
Figure 6C:
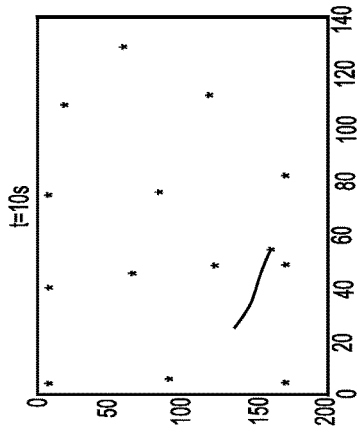
Figure 6D:
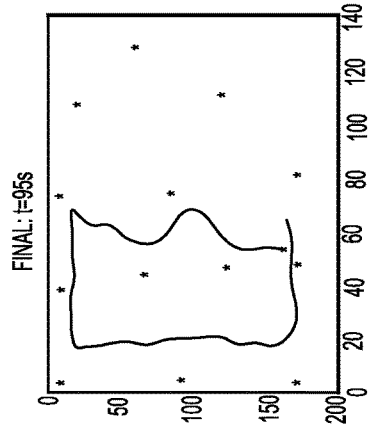
Figure 6E:
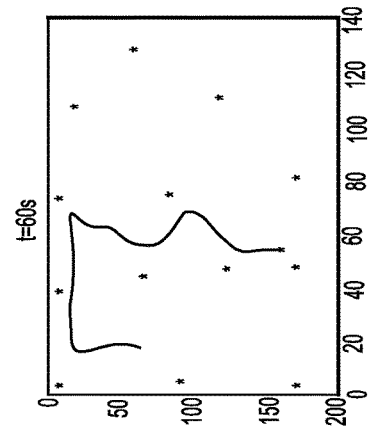
Figure 6F:
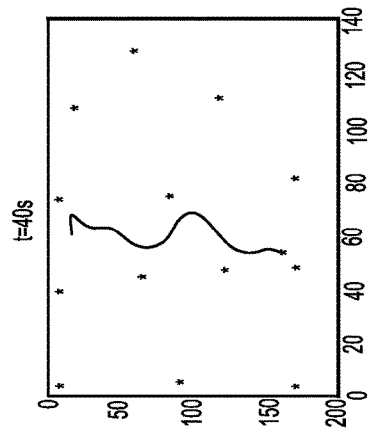

FIG. 5 depicts an electronic communications network in which location accuracy crowd-sourcing logic may operate in accordance with an example embodiment. As shown, mobile devices 170 are present in a general geographical area, e.g., inside a store. In the embodiment shown, each mobile device 170 includes path determination logic 120. As explained above, wireless access points 160 may be leveraged in a location determination system to obtain an estimated coarse absolute location (CAL) of a given mobile device. In this case, two wireless access point location determination systems are deployed using first wireless access points 560, and second wireless access points 565. Location accuracy crowd-sourcing logic 520 is hosted on server 110.

The obtained absolute location is fused or matched with IMU data from the mobile device 170 to refine the absolute location. Confidence information or a confidence level value of the match may also be generated in connection with the fusion of the absolute and relative locations.

In accordance with an embodiment, each mobile device 170 automatically and periodically reports its location estimation confidence level to location accuracy crowd-sourcing logic 510 deployed on, e.g., server 110 or another location. Location accuracy crowd-sourcing logic 510 is configured to aggregate location confidence level reports from multiple mobile devices 170 over time, so as to identify "trouble spots" for further improvement in future deployments. Such trouble spots might include a dead zone in which a wireless access point location determination system does not provide useful absolute location information, or walls or shelving, etc. in the geographical area (store) that cause interference or blockage to signals associated with the wireless access point location determination systems.

Deriving Location Estimation Confidence Level

A mobile device's location is continuously being estimated, with accuracy often improving over time as more data points become available. It is often possible to compute a confidence level of the estimated location based on how well the various location information sources (first wireless access point 560 and second wireless access points 565) e.g., Wi-Fi and Bluetooth and local phone sensor data align with each other. For example, the location estimation confidence may be computed as the "goodness" of fit between wireless access point location determination system (CAL data) and mobile device IMU path (ARL data).

When a mobile device 170 discovers fault events (discussed below), the mobile device 170 can update the location accuracy crowd-sourcing logic 510 about the event, and the location of the problem. The location accuracy crowd-sourcing logic 510 aggregates feedback from the multiple mobile devices 170 over time to determine if more indoor location infrastructure devices such as iBeacons or wireless access points might be desirable for those affected locations, or if the problem is an isolated instance. Two types of localization errors are of particular interest.

A first type of localization error is a known low accuracy for the current location. This is usually caused by lack of information, e.g., not enough data points from the wireless access point location determination system and can be reported instantaneously.

A second type of localization error is a known erroneous location for a previous location. That is, path determination logic 120 on a mobile device 170 may discover at a later time that its initial localization estimates were erroneous. Consequently, path determination logic 120 may report back on the error for the previous location associated with the previous timestamp.

Whether remedial actions are to be taken can be governed by consulting a "heat-map" that captures popular user trajectories, so that the location accuracy crowd-sourcing logic 510 can prioritize problematic areas with heavy traffic. Points of interest (such as corners, seating areas, popular shopping areas, etc.) can also be added to a list of contextual inputs and combined with this approach, which then helps improve location accuracy (without modifying the deployment of, e.g., wireless access points 560, 565).

Figure 7:
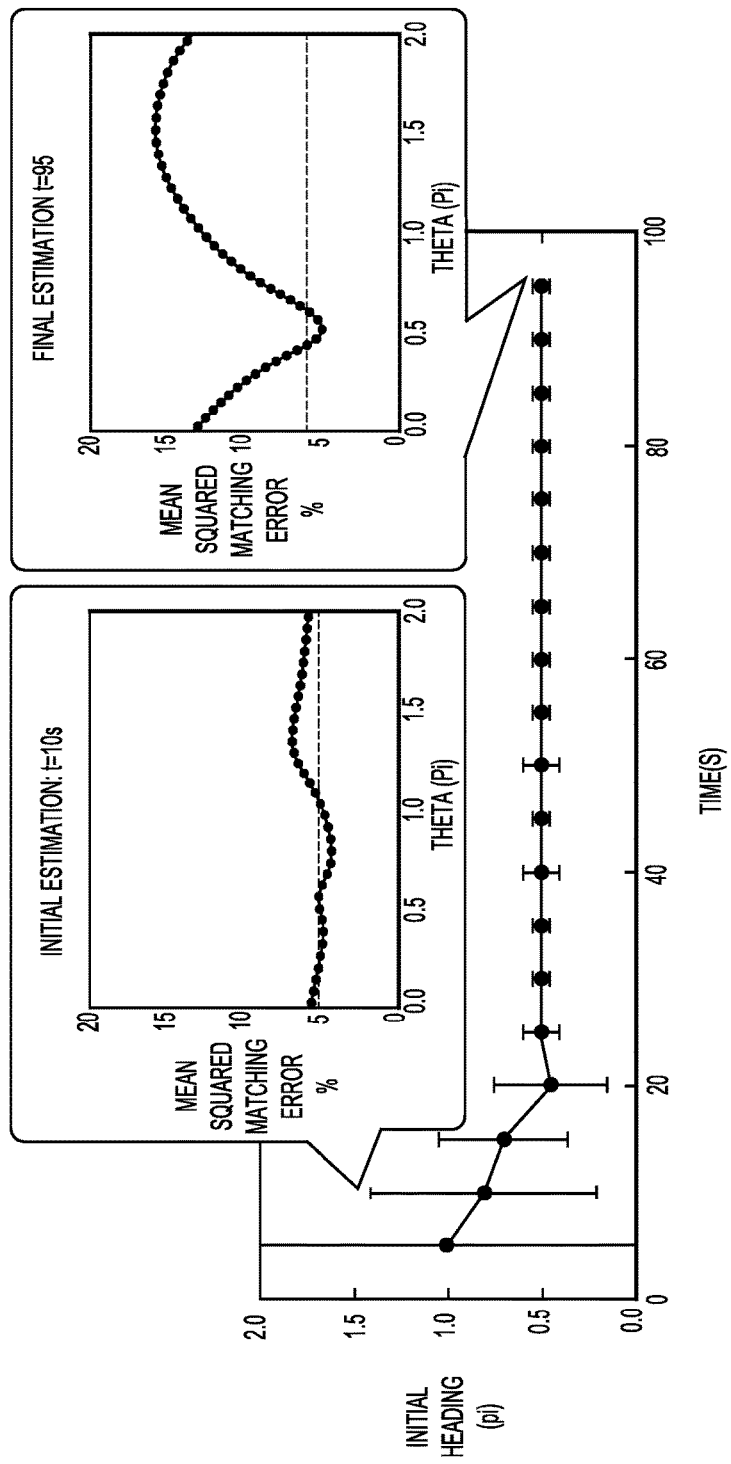
FIG. 7 shows the corresponding evolution of the estimated initial heading angle along with the error bound in accordance with an example embodiment.

In a practical example, the localization accuracy is characterized in terms of confidence level of an initial heading angle estimation for a mobile device's path. FIGS. 6A-6F illustrate the evolution of an estimated user trajectory over time in accordance with an example embodiment. At each time instant, path determination logic 120 calculates, e.g., the mean-squared-error (MSE) between observed Bluetooth signal strength from nearby iBeacon nodes (second wireless access points 565) and corresponding predictions derived from the estimated user path (using CAL data (from first wireless access points 560 and ARL data) for all candidate initial heading angles. The error bound of this estimation is defined as the +/− range within which the matching MSE is less than 20% more of the minimum error. FIG. 7 shows the corresponding evolution of the estimated initial heading angle along with the error bound.

As the example shows, the location accuracy for a given mobile device 170 initially has large error bound regarding its estimation, due to very limited availability of data points. By the time t=20 seconds, it has collected enough data points to arrive at a robust estimate of the initial heading angle, and consequently the estimated location of mobile device 170. The error bound remains low for rest of this user trajectory. This error information is periodically sent to the location accuracy crowd-sourcing logic 510 to improve future location accuracy and to advise remedial actions.

Figure 8:
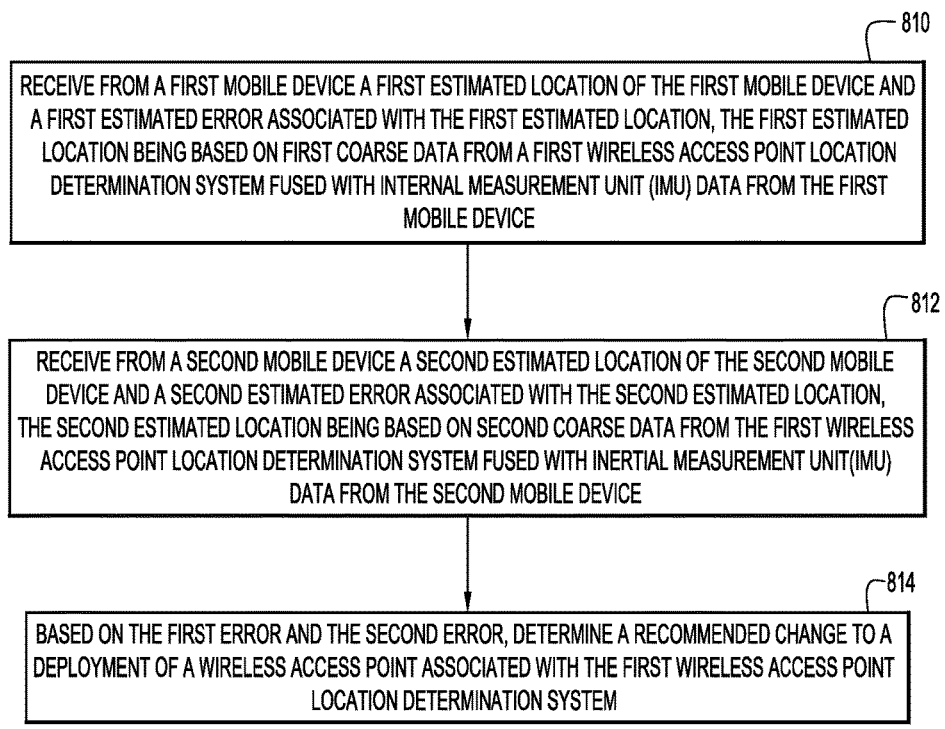
FIG. 8 depicts flow chart of a series operations that may be performed by location accuracy crowd-sourcing logic in accordance with an example embodiment.

FIG. 8 is a flow chart of a series of operations that may be performed by location accuracy crowd-sourcing logic 520. At 810, location accuracy crowd-sourcing logic receives from a first mobile device a first estimated location of the first mobile device and a first estimated error associated with the first estimated location, the first estimated location being based on first coarse data from a first wireless access point location determination system fused with inertial measurement unit (IMU) data from the first mobile device.

At 812, location accuracy crowd-sourcing logic receives from a second mobile device a second estimated location of the second mobile device and a second estimated error associated with the second estimated location, the second estimated location being based on second coarse data from the first wireless access point location determination system fused with inertial measurement unit (IMU) data from the second mobile device.

At 814, based on the first error and the second error, location accuracy crowd-sourcing logic determines a recommended change to a deployment of a wireless access point associated with the first wireless access point location determination system.

In an embodiment, the recommended change to a deployment of a wireless access point associated with the first wireless access point location determination system comprises a recommended change of a location of a given wireless access point or a recommended additional of a new wireless access point. That is, location accuracy crowd-sourcing logic is configured to identify areas of relatively high error, and recommend adding a new wireless access point at a particular location, or moving an already-deployed wireless access point to another location.

Thus, described herein is a methodology to use crowd-source information of location estimation errors as feedback to improve indoor location accuracy. This methodology can be used to replace, or at least complement, site surveys and heat maps in evaluating indoor localization services. The described embodiments automatically identify problematic locations that are associated with real run-time problems, use live operating clients (e.g., path determination logic) and therefore does not require special test clients and setups (eliminates the need for expensive and long site surveys).

As noted, the methodology can be used to automatically generate recommendations for deployment of additional indoor location infrastructure hardware (such as WAPs/iBeacons) for improving overall location estimates. This is important as it provides independent deployment specific steps (i.e., precisely where to add infrastructure) that can be taken to improve location estimates on a floor. It is also possible to provide a quantitative value of an amount of improvement that deployments can achieve by adding additional devices which is helpful essential in justifying any enterprise IT upgrade.

Enhancements to IMU Data

Accelerometer and gyroscope sensors in mobile devices such as mobile phones and watches can be used to perform inertial navigation, also referred to as dead reckoning. Real time useful inertial navigation requires an accurate and low latency measurement of distance traveled. Currently available implementations are designed to measure long term distance walked (e.g., Apple iOS CMPedometer API, Android FitnessSensorService API) and use fixed step size and long term averaging techniques. This makes such APIs unsuitable for true real time navigation applications. Embodiments described below provide a method to estimate pedestrian walking distance with high accuracy and low latency based on accelerometer sensor data. Such information may be used to enhance the IMU data generated by a mobile device 170 in connection with ARL data.

Figure 9:
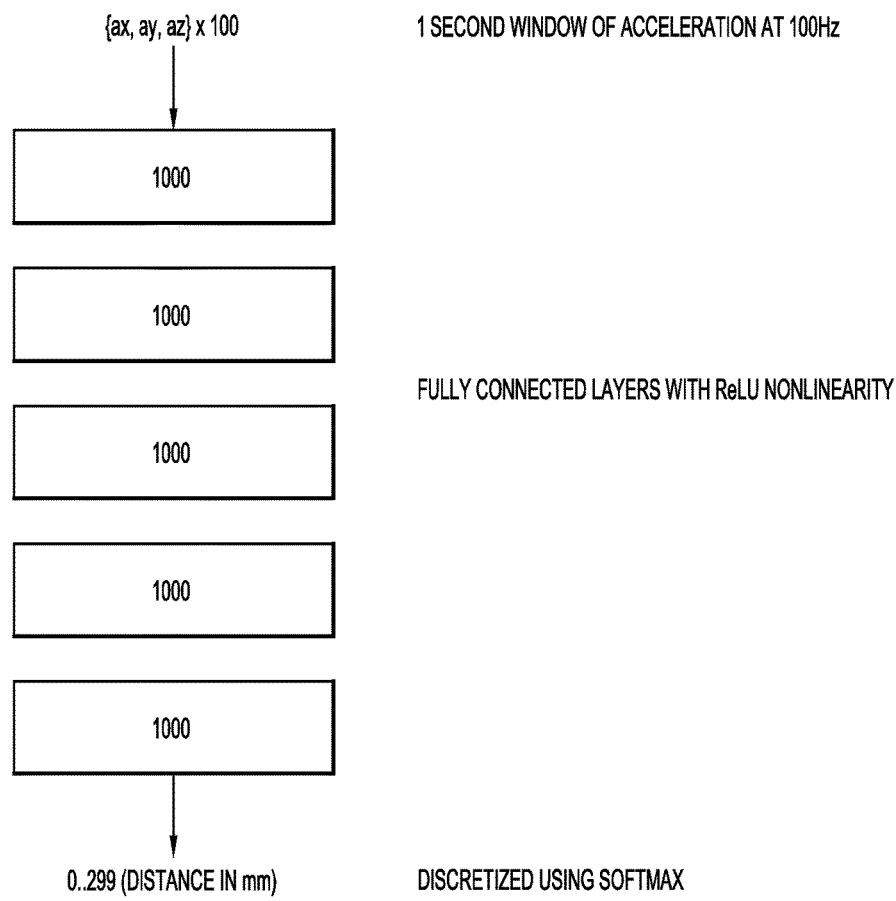
FIG. 9 depicts a deep neural network architecture configured to convert accelerometer data into distance travelled in accordance with an example embodiment.
Figure 10:
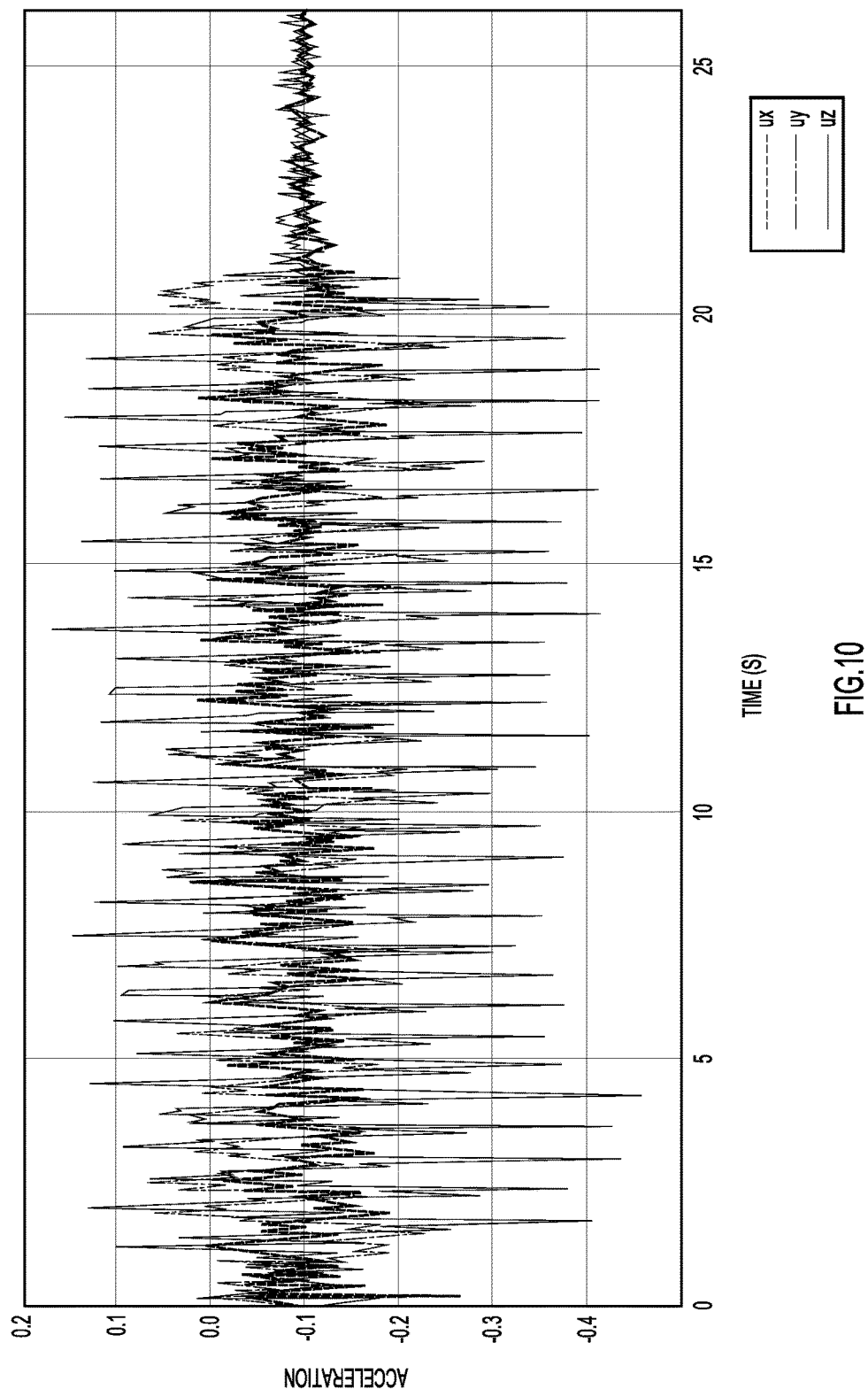
FIG. 10 shows a graph of 2500 samples of accelerometer X,Y,Z data in accordance with an example embodiment.

FIG. 9 depicts a deep neural network architecture configured to convert accelerometer data into distance travelled. Accelerometer X,Y,Z data is sampled at 100 Hz and is normalized in a common reference frame with the Z axis pointing down. This normalization uses the gyroscope sensor and is commonly available using standard libraries and APIs. FIG. 10 shows 2500 samples of accelerometer X,Y,Z data.

The normalized accelerometer X,Y,Z data is formatted into a 1 second sliding window, which produces a 300 element floating point vector which is generated at the sampling rate of 100 Hz. This vector is provided as an input to a deep neural network with multiple fully connected layers and rectified linear nonlinearities.

The output of the neural network is a probability distribution which represents the distance traveled during the input window. The output is discretized to 300 values and the argmax of the probability vector is used to determine the distance traveled.

The network processes these sliding windows at 100 Hz, which provides low latency estimation of the distance traveled. A smoothing filter may optionally be applied to the time series of distance estimates.

FIG. 9 indicates that the network layers are fully connected with ReLU (rectified linear unit) nonlinearity. ReLU nonlinearity was used in an operational implementation of the instant embodiment. The ADAM optimizer available in Tensorflow was used and the training loss converged with high accuracy on a test set. It is possible that other nonlinear activation functions may also be used.

More specifically, as shown in FIG. 9, the neural network of the instant embodiment consists of 5 layers, each with 1000 units. The units are fully connected at each layer and use a nonlinear activation function. This is a sophisticated deep neural network and is trained to learn a wide variety of walking patterns from the accelerometer input data. The Tensorflow code for the neural network is shown below

```
x=tf.placeholder("float", [None,100*3])
y=tf.placeholder("int32", [None])
net=tf.layers.dense(inputs=x,          units=1000, activation=tf.nn.relu)
net=tf.layers.dense(inputs=net,        units=1000, activation=tf.nn.relu)
net=tf.layers.dense(inputs=net,        units=1000, activation=tf.nn.relu)
net=tf.layers.dense(inputs=net,        units=1000, activation=tf.nn.relu)
net=tf.layers.dense(inputs=net,        units=1000, activation=tf.nn.relu)
net=tf.layers.dense(inputs=net,        units=300, activation=None)
cost=tf.reduce_sum(tf.nn.sparse_softmax_cross_entropy_with_logits(net,y))
optimizer=tftrain.AdamOptimizer(learning_rate=0.001).minimize(cost)
pred=tf.nn.softmax(net)
```

To train the neural network, {data, label} pairs are provided where the data is a 1 second window of accelerometer data and the label is the actual distance walked. To generate this data, a human was instrumented with a helmet mounted GPS receiver. Since standard GPS is only accurate to approximately 3 meters, a differential GPS receiver which is accurate to 1 cm, was used. The human was also carrying a mobile phone which simultaneously recorded accelerometer readings at 100 Hz. By recording large amounts of walking data with different people, different walking styles, different shoes, etc., a sufficient training database was created.

The trained deep neural network can then be deployed on a mobile phone with local real time data. At run time, the mobile phone accelerometer data is sampled and sent to the trained neural network in one second sliding windows. The neural network then directly outputs an estimate of the distance walked at the sample rate.

Note that distance determination from acceleration is generally an ill-posed problem, since an arbitrary initial speed can be added without changing acceleration. The method described herein works because people only walk in specific ways, and the resulting acceleration patterns reside in a low dimensional space that can be modeled by a neural network.

Also, for 2D movement, theoretically only 2D (XY) components of acceleration could be used. However, the embodiments described herein employ all three dimensions of acceleration in order to robustly "pattern match" accelerometer windows to predict distance walked. For instance, this approach can better take into account different walking patterns due to differences in weight, height, gender, shoes, surfaces, etc.

In an embodiment, low latency and fine time granularity on the order of 10 ms has been proven. Also, the methodology can be implemented on currently available mobile devices (e.g., smart phones) without additional hardware as a result of a low computation load since the inputs are small floating point vectors.

There is also the possibility of fine tuning per-user distance measurements based on the CAL data and/or user provided or crowd-sourced underlying path information in a map. For example, the neural network can be tailored to a subgroup of user (or, in the very extreme, a single user of the smart phone) by leveraging the CAL coordinates as ground-truth of "distance traveled" via the continuous learning/training. The neural network can also be trained continuously. For example, the mobile device could capture sensor readings along with the triangulated X,Y location from the wireless access points. This data could be added to the training data set to improve the accuracy of the neural network. In general, the neural network becomes more accurate with more data. In addition, individual training data sets could be collected for each person, and then each individual could have a neural network which is personalized and therefore more accurate.

It is also possible to build upon the existing embodiment and augment the deep neural network to take into account user-specific inputs, such as height and gender. Such explicit information about user characteristics allows the neural network to learn a more accurate prediction of walking step size, and thus distance traveled.

Real time inertial navigation is an essential component of an indoor turn by turn (i.e., highly accurate) navigation solution. The approach described herein uses a deep neural network and a novel training procedure to implement a high-accuracy, low latency pedestrian distance estimation system whose output can be used to enhance, e.g., IMU data provided by a mobile device.

Figure 11:
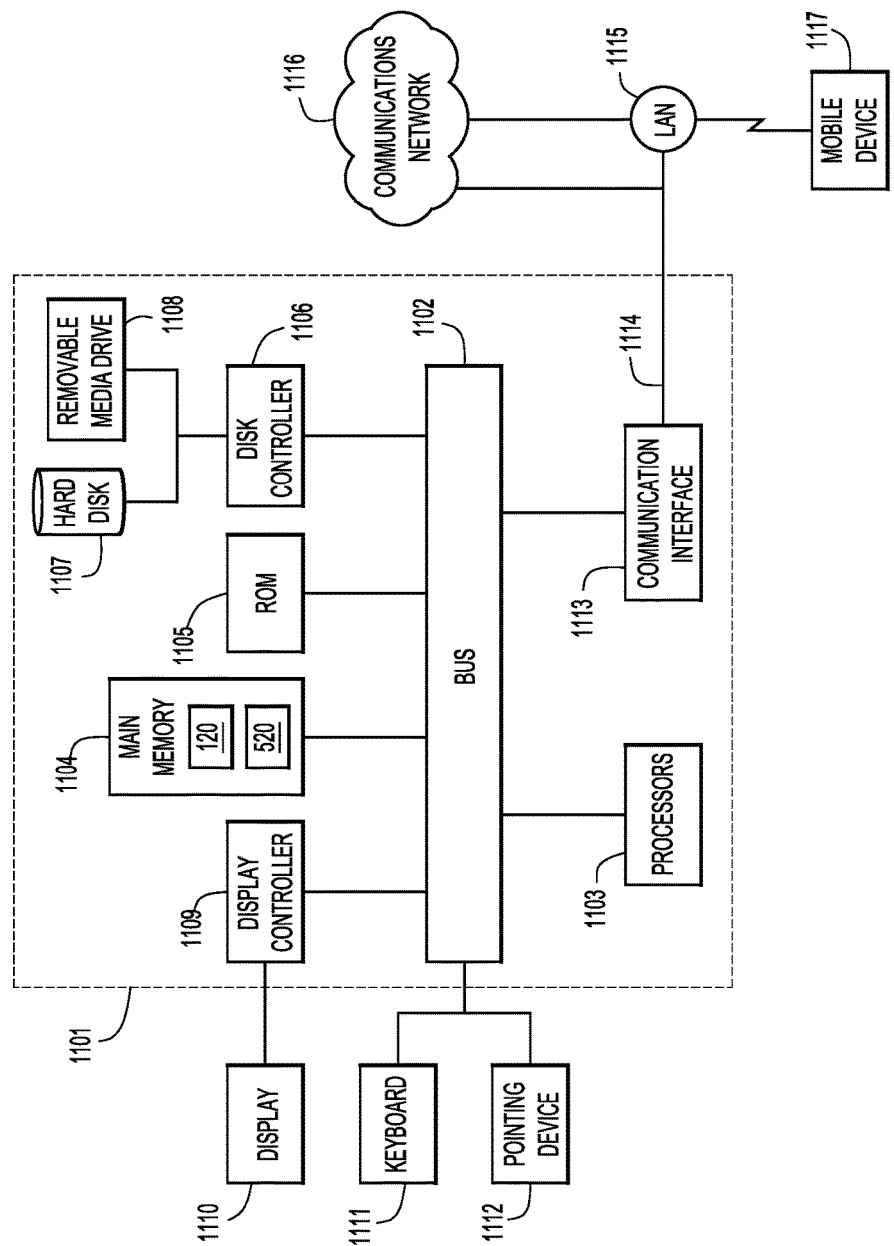
FIG. 11 is a block diagram of a device (e.g., a server) on which the spammer domain identification and prediction logic may be implemented.

FIG. 11 is a block diagram of a device or apparatus (e.g., a server) on which anomaly detection logic may be implemented. The apparatus may be implemented on or as a computer system 1101. The computer system 1101 may be programmed to implement a computer based device. The computer system 1101 includes a bus 1102 or other communication mechanism for communicating information, and a processor 1103 coupled with the bus 1102 for processing the information. While the figure shows a single block 1103 for a processor, it should be understood that the processor 1103 represents a plurality of processors or processing cores, each of which can perform separate processing. The computer system 1101 may also include a main memory 1104, such as a random access memory (RAM) or other dynamic storage device (e.g., dynamic RAM (DRAM), static RAM (SRAM), and synchronous DRAM (SD RAM)), coupled to the bus 1102 for storing information and instructions (e.g., the logic 120, 520) to be executed by processor 1103. In addition, the main memory 1104 may be used for storing temporary variables or other intermediate information during the execution of instructions by the processor 1103.

The computer system 1101 may further include a read only memory (ROM) 1105 or other static storage device (e.g., programmable ROM (PROM), erasable PROM (EPROM), and electrically erasable PROM (EEPROM)) coupled to the bus 1102 for storing static information and instructions for the processor 1103.

The computer system 1101 may also include a disk controller 1106 coupled to the bus 1102 to control one or more storage devices for storing information and instructions, such as a magnetic hard disk 1107, and a removable media drive 1108 (e.g., floppy disk drive, read-only compact disc drive, read/write compact disc drive, compact disc jukebox, tape drive, and removable magneto-optical drive). The storage devices may be added to the computer system 1101 using an appropriate device interface (e.g., small computer system interface (SCSI), integrated device electronics (IDE), enhanced-IDE (E-IDE), direct memory access (DMA), or ultra-DMA).

The computer system 1101 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 1101 may also include a display controller 1109 coupled to the bus 1102 to control a display 1110, such as a cathode ray tube (CRT) or liquid crystal display (LCD), light emitting diode (LED) display, for displaying information to a computer user. The computer system 1101 may include input devices, such as a keyboard 1111 and a pointing device 1112, for interacting with a computer user and providing information to the processor 1103. The pointing device 1112, for example, may be a mouse, a trackball, or a pointing stick for communicating direction information and command selections to the processor 1103 and for controlling cursor movement on the display 1110.

The computer system 1101 performs a portion or all of the processing operations of the embodiments described herein in response to the processor 1103 executing one or more sequences of one or more instructions contained in a memory, such as the main memory 1104. Such instructions may be read into the main memory 1104 from another computer readable medium, such as a hard disk 1107 or a removable media drive 1108. One or more processors in a multi-processing arrangement may also be employed to execute the sequences of instructions contained in main memory 1104. In alternative embodiments, hard-wired circuitry may be used in place of or in combination with software instructions. Thus, embodiments are not limited to any specific combination of hardware circuitry and software.

As stated above, the computer system 1101 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 1101, for driving a device or devices for implementing the described embodiments, and for enabling the computer system 1101 to interact with a human user. Such software may include, but is not limited to, device drivers, operating systems, development tools, and applications software. Such computer readable storage media further includes a computer program product for performing all or a portion (if processing is distributed) of the processing presented herein.

The computer code may be any interpretable or executable code mechanism, including, but not limited to scripts, interpretable programs, dynamic link libraries (DLLs), Java classes, and complete executable programs. Moreover, parts of the processing may be distributed for better performance, reliability, and/or cost.

The computer system 1101 also includes a communication interface 1113 coupled to the bus 1102. The communication interface 1113 provides a two-way data communication coupling to a network link 1114 that is connected to, for example, a local area network (LAN) 1115, or to another communications network 1116. For example, the communication interface 1113 may be a wired or wireless network interface card or modem (e.g., with SIM card) configured to attach to any packet switched (wired or wireless) LAN or WWAN. As another example, the communication interface 1113 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1113 sends and receives electrical, electromagnetic or optical signals that carry digital data streams representing various types of information.

The network link 1114 typically provides data communication through one or more networks to other data devices. For example, the network link 1114 may provide a connection to another computer through a local area network 1115 (e.g., a LAN) or through equipment operated by a service provider, which provides communication services through a communications network 1116. The local network 1114 and the communications network 1116 use, for example, electrical, electromagnetic, or optical signals that carry digital data streams, and the associated physical layer (e.g., CAT 5 cable, coaxial cable, optical fiber, etc.). The signals through the various networks and the signals on the network link 1114 and through the communication interface 1113, which carry the digital data to and from the computer system 1101 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1101 can transmit and receive data, including program code, through the network(s) 1115 and 1116, the network link 1114 and the communication interface 1113. Moreover, the network link 1114 may provide a connection to a mobile device 1117 such as a personal digital assistant (PDA) laptop computer, cellular telephone, or modem and SIM card integrated with a given device.

In sum, there is provided a methodology including operations of determining coarse location coordinates for a mobile device, anchoring the coarse location coordinates to a map, receiving inertial measurement unit data supplied by the mobile device, wherein the inertial measurement unit data is indicative of relative location coordinates of the mobile device, generating an unanchored path of the mobile device based on the relative location coordinates, and anchoring the unanchored path of the mobile device to the map in a position that optimizes a match between the coarse location coordinates and the relative location coordinates of the mobile device.

In an embodiment, the coarse location coordinates are derived from a wireless access point location determination system. The wireless access point location determination system may be based on at least one of a Wi-Fi wireless access point and a Bluetooth wireless access point. The inertial measurement unit data is received from at least one of an accelerometer, a gyroscope and a compass.

In one implementation, anchoring the unanchored path of the mobile device to the map is performed by least square matching of the coarse location coordinates and the relative location coordinates based on time. In another possible implementation, anchoring the unanchored path of the mobile device to the map is performed by a random sampling optimization technique.

In an embodiment, the methodology includes calculating pair-wise distance between pairs of the coarse location coordinates and the relative location coordinates, and when a pair-wise distance of a given pair of the coarse location coordinates and the relative location coordinates is greater than a predetermined threshold, removing the given pair of the coarse location coordinates and the relative location coordinates from the anchoring operations.

In an embodiment, the methodology includes setting a window size of coarse location coordinates and relative location coordinates to constrain a totality of data that is processed in the anchoring operations.

In an implementation, anchoring the unanchored path of the mobile device to the map in a position that optimizes a match between the coarse location coordinates and the relative location coordinates of the mobile device includes constraining the anchoring operation based on map data.

In an embodiment, at least the operation of anchoring the unanchored path of the mobile device to the map in a position that optimizes a match between the coarse location coordinates and the relative location coordinates of the mobile device is performed on a remote server.

There is further provided a device that includes an interface unit configured to enable network communications, a memory, and one or more processors coupled to the interface unit and the memory, and configured to: determine coarse location coordinates for a mobile device, anchor the coarse location coordinates to a map, receive inertial measurement unit data supplied by the mobile device, wherein the inertial measurement unit data is indicative of relative location coordinates of the mobile device, generate an unanchored path of the mobile device based on the relative location coordinates, and anchor the unanchored path of the mobile device to the map in a position that optimizes a match between the coarse location coordinates and the relative location coordinates of the mobile device.

In an embodiment, the coarse location coordinates are derived from a wireless access point location determination system. The wireless access point location determination system may be based on at least one of a Wi-Fi wireless access point and a Bluetooth wireless access point. The inertial measurement unit data is received from at least one of an accelerometer, a gyroscope and a compass In a further embodiment, the processors may be configured to anchor the unanchored path of the mobile device to the map by least square matching of the coarse location coordinates and the relative location coordinates based on time.

In a still further embodiment, the processors may be configured to anchor the unanchored path of the mobile device to the map by a random sampling optimization technique.

In another implementation, there is provided one or more non-transitory computer readable storage media encoded with software comprising computer executable instructions and when the software is executed is operable to: determine coarse location coordinates for a mobile device, anchor the coarse location coordinates to a map, receive inertial measurement unit data supplied by the mobile device, wherein the inertial measurement unit data is indicative of relative location coordinates of the mobile device, generate an unanchored path of the mobile device based on the relative location coordinates, and anchor the unanchored path of the mobile device to the map in a position that optimizes a match between the coarse location coordinates and the relative location coordinates of the mobile device.

In an embodiment, the coarse location coordinates are derived from a wireless access point location determination system based on at least one of a Wi-Fi wireless access point and a Bluetooth wireless access point.

In still another embodiment, when the software is executed it is further operable to anchor the unanchored path of the mobile device to the map by least square matching of the coarse location coordinates and the relative location coordinates based on time and/or by a random sampling optimization technique.

There is provided a methodology including operations of receiving from a first mobile device a first estimated location of the first mobile device and a first estimated error associated with the first estimated location, the first estimated location being based on first coarse data from a first wireless access point location determination system fused with inertial measurement unit (IMU) data from the first mobile device, receiving from a second mobile device a second estimated location of the second mobile device and a second estimated error associated with the second estimated location, the second estimated location being based on second coarse data from the first wireless access point location determination system fused with IMU data from the second mobile device, and based on the first estimated error and the second estimated error, determining a recommended change to a deployment of a wireless access point associated with the first wireless access point location determination system.

The first wireless access point may be a wireless local area networking device based on the IEEE 802.11 standards. The first estimated error may be is calculated using a second wireless access point location determination system. The second wireless access point location determination system may include a wireless access point configured to exchange data over short distances using short-wavelength UHF radio waves in the ISM band from 2.4 to 2.485 GHz.

In an embodiment, the methodology includes determining a recommended change to a deployment of a wireless access point associated with the first wireless access point location determination system comprises comparing the first estimated location of the first mobile device and the second estimated location of the second mobile device to a heat-map that captures trajectories of the first mobile device and the second mobile device.

In an implementation, the first estimated error associated with the first estimated location includes a confidence level of an initial heading angle estimation for a path of the first mobile device. The methodology may further include receiving the first estimated error or the second estimated error after the first estimated location or the second estimated location is updated with a higher confidence level.

The recommended change to a deployment of a wireless access point associated with the first wireless access point location determination system may include a recommended change of a location of a given wireless access point or a recommended addition of a new wireless access point.

There is further provided a device that includes an interface unit configured to enable network communications, a memory, and one or more processors coupled to the interface unit and the memory, and configured to: receive from a first mobile device a first estimated location of the first mobile device and a first estimated error associated with the first estimated location, the first estimated location being based on first coarse data from a first wireless access point location determination system fused with inertial measurement unit (IMU) data from the first mobile device, receive from a second mobile device a second estimated location of the second mobile device and a second estimated error associated with the second estimated location, the second estimated location being based on second coarse data from the first wireless access point location determination system fused with IMU data from the second mobile device, and based on the first error and the second error, determine a recommended change to a deployment of a wireless access point associated with the first wireless access point location determination system.

The first wireless access point is a wireless local area networking device based on the IEEE 802.11 standards. The first estimated error is calculated using a second wireless access point location determination system. The second wireless access point location determination system may include a wireless access point configured to exchange data over short distances using short-wavelength UHF radio waves in the ISM band from 2.4 to 2.485 GHz.

The one or more processors may be configured to determine a recommended change to a deployment of a wireless access point associated with the first wireless access point location determination system by comparing the first estimated location of the first mobile device and the second estimated location of the second mobile device to a "heat-map" that captures trajectories of the first mobile device and the second mobile device.

In an embodiment, the first estimated error associated with the first estimated location may include a confidence level of an initial heading angle estimation for a path of the first mobile device.

The one or more processors may be further configured to receive the first estimated error or the second estimated error after the first estimated location or the second estimated location is updated with a higher confidence level.

In an embodiment, the recommended change to a deployment of a wireless access point associated with the first wireless access point location determination system comprises a recommended change of a location of a given wireless access point or a recommended addition of a new wireless access point.

In another embodiment, there is provided One or more non-transitory computer readable storage media encoded with software comprising computer executable instructions and when the software is executed is operable to: receive from a first mobile device a first estimated location of the first mobile device and a first estimated error associated with the first estimated location, the first estimated location being based on first coarse data from a first wireless access point location determination system fused with inertial measurement unit (IMU) data from the first mobile device, receive from a second mobile device a second estimated location of the second mobile device and a second estimated error associated with the second estimated location, the second estimated location being based on second coarse data from the first wireless access point location determination system fused with IMU data from the second mobile device, and based on the first error and the second error, determine a recommended change to a deployment of a wireless access point associated with the first wireless access point location determination system.

The recommended change to a deployment of a wireless access point associated with the first wireless access point location determination system may include a recommended change of a location of a given wireless access point or a recommended addition of a new wireless access point.

The above description is intended by way of example only. Various modifications and structural changes may be made therein without departing from the scope of the concepts described herein and within the scope and range of equivalents of the claims.

What is claimed is:

1. A method comprising:
receiving from a first mobile device a first estimated location of the first mobile device and a first estimated error associated with the first estimated location, the first estimated location being based on first coarse data from a first wireless access point location determination system fused with inertial measurement unit (IMU) data from the first mobile device;
receiving from a second mobile device a second estimated location of the second mobile device and a second estimated error associated with the second estimated location, the second estimated location being based on second coarse data from the first wireless access point location determination system fused with IMU data from the second mobile device; and
based on the first estimated error and the second estimated error, determining a recommended change to a deployment of a wireless access point associated with the first wireless access point location determination system,
wherein determining a recommended change to a deployment of a wireless access point associated with the first wireless access point location determination system comprises comparing the first estimated location of the first mobile device and the second estimated location of the second mobile device to a heat-map that captures trajectories of the first mobile device and the second mobile device, and
wherein the IMU data comprises accelerometer data.

2. The method of claim 1, wherein the first wireless access point is a wireless local area networking device based on the IEEE 802.11 standards.

3. The method of claim 2, wherein the first estimated error is calculated using a second wireless access point location determination system.

4. The method of claim 3, wherein the second wireless access point location determination system comprises a wireless access point configured to exchange data over short distances using short-wavelength UHF radio waves in the ISM band from 2.4 to 2.485 GHz.

5. The method of claim 1, wherein the first estimated error associated with the first estimated location comprises a confidence level of an initial heading angle estimation for a path of the first mobile device.

6. The method of claim 1, further comprising receiving the first estimated error or the second estimated error after the first estimated location or the second estimated location is updated with a higher confidence level.

7. The method of claim 1, wherein the recommended change to a deployment of a wireless access point associated with the first wireless access point location determination system comprises a recommended change of a location of a given wireless access point or a recommended addition of a new wireless access point.

8. A device comprising:
an interface unit configured to enable network communications;
a memory; and
one or more processors coupled to the interface unit and the memory, and configured to:
receive from a first mobile device a first estimated location of the first mobile device and a first estimated error associated with the first estimated location, the first estimated location being based on first coarse data from a first wireless access point location determination system fused with inertial measurement unit (IMU) data from the first mobile device;
receive from a second mobile device a second estimated location of the second mobile device and a second estimated error associated with the second estimated location, the second estimated location being based on second coarse data from the first wireless access point location determination system fused with IMU data from the second mobile device; and
based on the first error and the second error, determine a recommended change to a deployment of a wireless access point associated with the first wireless access point location determination system,
wherein the one or more processors are configured to determine a recommended change to a deployment of a wireless access point associated with the first wireless access point location determination system by comparing the first estimated location of the first mobile device and the second estimated location of the second mobile device to a heat-map that captures trajectories of the first mobile device and the second mobile device, and
wherein the IMU data comprises accelerometer data.

9. The device of claim 8, wherein the first wireless access point is a wireless local area networking device based on the IEEE 802.11 standards.

10. The device of claim 9, wherein the first estimated error is calculated using a second wireless access point location determination system.

11. The device of claim 10, wherein the second wireless access point location determination system comprises a wireless access point configured to exchange data over short distances using short-wavelength UHF radio waves in the ISM band from 2.4 to 2.485 GHz.

12. The device of claim 8, wherein the first estimated error associated with the first estimated location comprises a confidence level of an initial heading angle estimation for a path of the first mobile device.

13. The device of claim 8, further configured to receive the first estimated error or the second estimated error after the first estimated location or the second estimated location is updated with a higher confidence level.

14. The device of claim 8, wherein the recommended change to a deployment of a wireless access point associated with the first wireless access point location determination system comprises a recommended change of a location of a given wireless access point or a recommended addition of a new wireless access point.

15. One or more non-transitory computer readable storage media encoded with software comprising computer executable instructions and when the software is executed is operable to:
- receive from a first mobile device a first estimated location of the first mobile device and a first estimated error associated with the first estimated location, the first estimated location being based on first coarse data from a first wireless access point location determination system fused with inertial measurement unit (IMU) data from the first mobile device;
- receive from a second mobile device a second estimated location of the second mobile device and a second estimated error associated with the second estimated location, the second estimated location being based on second coarse data from the first wireless access point location determination system fused with IMU data from the second mobile device; and
- based on the first error and the second error, determine a recommended change to a deployment of a wireless access point associated with the first wireless access point location determination system, wherein the software is further operable to determine a recommended change to a deployment of a wireless access point associated with the first wireless access point location determination system by comparing the first estimated location of the first mobile device and the second estimated location of the second mobile device to a heat-map that captures trajectories of the first mobile device and the second mobile device, and wherein the IMU data comprises accelerometer data.

16. The non-transitory computer readable storage media of claim 15, wherein the recommended change to a deployment of a wireless access point associated with the first wireless access point location determination system comprises a recommended change of a location of a given wireless access point or a recommended addition of a new wireless access point.

\* \* \* \* \*